US005445489A

United States Patent [19]
Evans et al.

[11] Patent Number: 5,445,489
[45] Date of Patent: Aug. 29, 1995

[54] HEAVY LOAD TRANSPORTER WITH IMPROVED JACKS

[75] Inventors: Glen A. Evans, Garwood, N.J.; Ruloff F. Kip, Jr., New Castle, N.Y.

[73] Assignee: AT&T IPM Corp., Coral Gables, Fla.

[21] Appl. No.: 324,065

[22] Filed: Oct. 14, 1994

[51] Int. Cl.⁶ ............................................. B60P 3/00
[52] U.S. Cl. ..................................... 414/458; 414/495; 414/917; 414/589; 254/10 R; 280/42
[58] Field of Search ............... 414/495, 498, 458, 459, 414/460, 461, 917, 589; 254/10 R, 10 B, 10 C, 8 R, 9 R, 9 B, 9 C; 280/42

[56] References Cited

U.S. PATENT DOCUMENTS

| 111,104 | 1/1871 | Brown | 254/10 R |
| 442,891 | 12/1890 | Hite | 254/10 R |
| 1,129,775 | 2/1915 | Anthony | 254/10 C |
| 2,513,440 | 7/1950 | Alderson | 254/10 C X |
| 2,628,068 | 2/1953 | Sehnert | 254/10 C |
| 2,931,519 | 4/1960 | Beach | 414/589 |
| 3,536,220 | 10/1970 | Coker | 414/458 |
| 3,781,030 | 12/1973 | Ekedal | 280/42 X |
| 4,522,548 | 6/1985 | Oswald et al. | 414/589 X |
| 4,619,464 | 10/1986 | Hwang | 280/42 X |
| 4,693,660 | 9/1987 | LaCroix | 414/458 |

FOREIGN PATENT DOCUMENTS 491789  9/1938  United Kingdom .............. 254/10 C

Primary Examiner—Frank E. Werner
Attorney, Agent, or Firm—Ruloff F. Kip, Jr.

[57] ABSTRACT

A transporter vehicle comprises two lifting devices which carry respective jacks and which can be joined at their ends by cross bars to form a rectangular dolly with a central opening therein. The lifting devices each have front and rear wheels so that the dolly can be rolled on floor surfaces. In practice, the two are placed on opposite sides of a load seated on a floor in the opening between those devices, the jacks are placed under the load, the cross bars are assembled with the side frames, the load is jacked up on its opposite sides to be above the floor and the load may then be transported. The jacks may include linkages which cause the load to be lifted wholly vertically while not undergoing any horizontal translational movement.

5 Claims, 7 Drawing Sheets

HEAVY LOAD TRANSPORTER WITH IMPROVED JACKS

FIELD OF THE INVENTION

This invention relates, generally, to vehicles for transporting loads between locations and, more particularly, to dollies and other hand propelled vehicles which are primarily used to transport loads over floors within buildings or otherwise over relatively short distances, and which incorporate hand actuated means for lifting a load off the floor to become supported by the vehicle.

BACKGROUND OF THE INVENTION

One such hand propelled vehicle which is now commercially available is a hand propelled "desk dolly" which comprises a wheeled platform movable over the floor by hand, a frame of lightweight steel members disposed over, and mounted by, and covering a greater horizontal area than, the platform, and a mechanical jack by which the frame can be adjusted up and down relative to the platform. In use, the dolly is pushed into the space forming the bay beneath the desk, the frame is jacked up to lift the desk off the floor, and the desk is then transported by rolling the dolly over the floor. The "desk" dolly just described has the disadvantage of lack of versatility in that the large areal size of its frame and the fact that it cannot be lowered below the platform makes it unsuitable for the lifting of many loads.

Another such hand propelled vehicle is a hand truck having a pair of swivelable wheels at its bottom and having thereon an outwardly projecting lifting shoe which, when the truck is mostly upright, is at the truck's bottom and is shiftable between fully lowered and raised positions by a hydraulic jack on the truck. To lift a heavy load seated on the floor, two of such trucks are brought to opposite sides of the load to insert their respective shoes under it, the hydraulic jacks of both trucks are then operated to shift their respective shoes simultaneously from their lowered positions to raised positions at which time the shoes are held to thereby lift and hold the load off the floor, and the two trucks are then tied together by flexible fabric belts to form with the load an assemblage which is movable over the floor to transport the load. A disadvantage of the arrangement just described is that the hydraulic jacks which are on the hand trucks are expensive. Further, two men are needed to lift the load simultaneously. Still further, because, after the load has been lifted, the two trucks are coupled together only by fabric belts, the resulting assemblage is at best a jury rig which provides support for the load which is less stable than a rigid support platform would provide and which, moreover, may be difficult to roll over the floor since all the wheels on the two trucks are swivelable.

SUMMARY OF THE INVENTION

One or more of the disadvantages described above as characterizing previous arrangements for listing a load off the floor and then transporting it are overcome by improvements according to the invention and of the character set out by the appended claims.

BRIEF DESCRIPTION OF DRAWINGS

For a better understanding of the invention, reference is made to the following description of an exemplary embodiment thereof, and to the accompanying drawings wherein.

Figure 1:
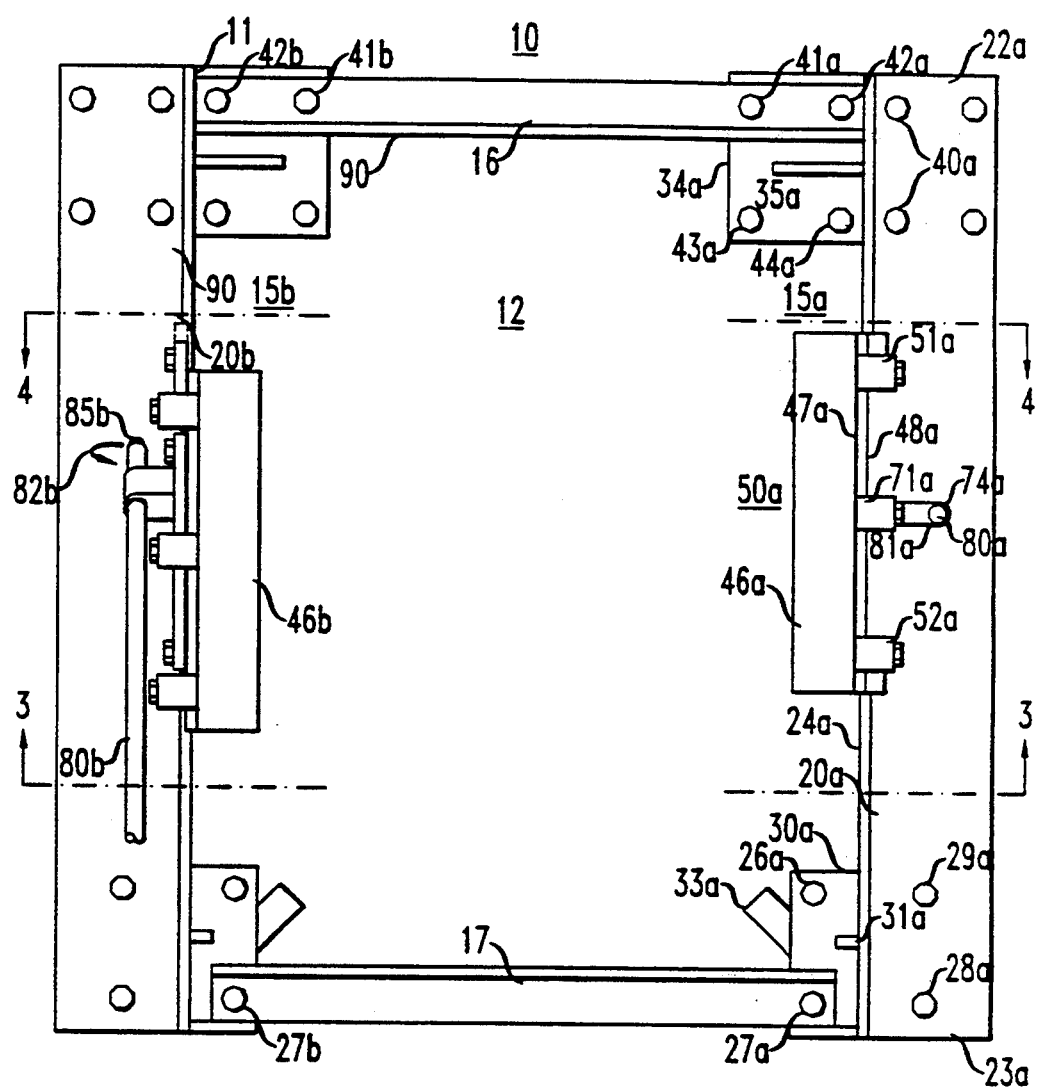
FIG. 1 is a plan view of a transporter vehicle according to the invention which comprises a dolly comprising two load lifting devices on the left and right sides of the dolly.

In the description which follows, elements which are counterparts of each other are designated by the same reference numerals while being distinguished from each other by different alphabetical or numerical suffixes for those numerals, and it is to be understood that, unless the context otherwise indicates, a description of any such elements is to be taken as equally applicable to all of its one or more counterparts. Moreover, while the specification and claims hereof may describe elements of the embodiment of the invention hereof as having certain spatial coordinates, (as being "horizontal" or vertical etc) it is to be understood that the invention hereof is not limited to particular spatial coordinates.

DETAILED DESCRIPTION OF THE EMBODIMENT

Referring now to FIG. 1, the reference numeral 10 designates a transporter vehicle according to the invention which, when assembled, comprises a dolly 11 comprising first and second load lifting devices 15a and 15b on the right and left sides (FIG. 1) of the dolly. The devices 15 are laterally spaced from each other in the horizontal plane to have therebetween an opening 12, and the devices are joined at their rear and front ends by rigid elongated tie means comprising rear and front tie bars 16, 17 both later described in more detail. The load lifting devices 15a and 15b are mirror images of each other but are otherwise substantially the same. Hence, only the device 15a will be described in full detail.

The lifting device 15a comprises support means provided by a horizontal beam 20a (FIG. 2) extending longitudinally between relatively forward and rearward positions 21a and 22a thereof. The beam 20a is an "L" shaped angle iron beam having an longitudinally elongated horizontal web 23a and a longitudinally elongated vertical web 24a upstanding from horizontal web 23a on its inner side, i.e., its side towards the other lifting device 15b. The beam 20a is supported above a floor 25 by wheel means now to be described.

Welded to the inner side of the beam 20 at its forward portion 21a is a horizontal shelf 30a (FIG. 1) having its underside flush with that of the beam web 23a. Shelf 30a is braced by a triangular web 31a extending between shelf 30 and the beam's vertical web 24a and welded to both. The shelf 30a and the adjacent portion of the beams horizontal web 23a provide a backing for a conventional swivelable-wheel caster 32a (FIG. 2) which has below its top a swivelable wheel 33a, and which is bolted at its top by bolts 26a–29a to that shelf and web.

Similarly, the beam 20a has welded thereto on its inner side at its rearward portion 22a a horizontal shelf 34a which is braced by a triangular web 35a extending between and welded to both the top of the shelf and the vertical web 24a of the beam, and the underside of which shelf 34a is flush with that of the underside of the horizontal web 23a of the beam. As a difference, however, from the single wheel provided at the beam's front, the backing provided by the rear shelf 34a and the adjacent portion of web 23a furnishes a mounting for two fixed-wheel conventional casters 36a and 37a (FIG. 3) bolted by bolts 40a, and 41a–44a (FIG. 1) at their tops to, respectively, the web 23a and the shelf 36a to be spaced from each other in the lateral direction, i.e., in the direction which is sidewise in relation to the longitudinal extent of beam 20a. The casters 36a and 37a are similar and they carry respective wheels 38a and 39a (FIG. 3) which rest on floor 25 and are not swivelable in the horizontal plane. The spacing between wheels 38a and 39a is significant for reasons later described. By virtue of lifting device 15a being provided with swivelable front wheel 33a and with fixed rear wheels 38a and 39a, the device is steerably rollable over floor 25.

The beam 20a of lifting device 15a carries between its forward and rearward portions 21a and 22a a lifting means of which one component is a metal shoe 50a, comprising a lower portion in the form of a horizontal lip 46a projecting inwards towards the other lifting device 15b from the bottom end of a vertical lift plate 47a abutting the inner side of the vertical web 24a of the beam and constituting another part of shoe 50a. Lip 46a and plate 47a may be formed by stamping or other other metal working from a single metal piece. As shown, lift plate 47a has fastened to it at its top on its outer side a horizontal shim 48a which overhangs the vertical web 24a of the beam and which shim projects out slightly beyond that web's outer side.

The shoe 50a is coupled to the beam 20a in a manner as follows. The lift plate 46a of shoe 50a has welded to its top a pair of "L" shaped brackets 51a and 52a (FIG. 1) which are longitudinally spaced from each other horizontally, and which have respective horizontal portions projecting outwardly from the lift plate and, also, respective vertical portions extending downwards from the outer ends of such horizontal portions to be disposed vertically opposite to, and horizontally spaced by respective gaps from, the shim 48a of the shoe 50a.

Disposed in those gaps are the upper ends of a pair of link arms 53a and 54a having unthreaded holes therein matched by registering unthreaded holes in the vertical portions of brackets 51a and 52a and matched, also, by threaded holes in shim 48a and in the lift plate 47a. Bolts 55a and 56a pass through those holes so that the heads of those bolts are on the outsides of the brackets 51a, 52a; unthreaded stem portions of those bolts are received within the arms 53a and 54a and shim 48a, and threaded, front-end stem portions of the bolts are received in the holes in the lift plate 46a to engage with the threads therein. The link arms 53a and 54a are thus pivotably coupled with the shoe 50a by the bolts 55a, 56a which serve as pivot pins for those arms.

The lower ends of link arms 53a, 54a are pivotably coupled in a similar manner to the beam 20a by (a) metal lugs 61a, 62a welded to and upstanding from the horizontal beam web 23a to be horizontally spaced from vertical beam web 24a by gaps in which those lower ends of those link arms are received, and by (b) bolts, 65a and 66a having stems of which unthreaded portions pass through unthreaded holes in those lugs and the lower ends of those arms, and of which threaded portions pass into holes in the vertical beam web 24a to engage within that web with threads in those last named holes.

Figure 2:
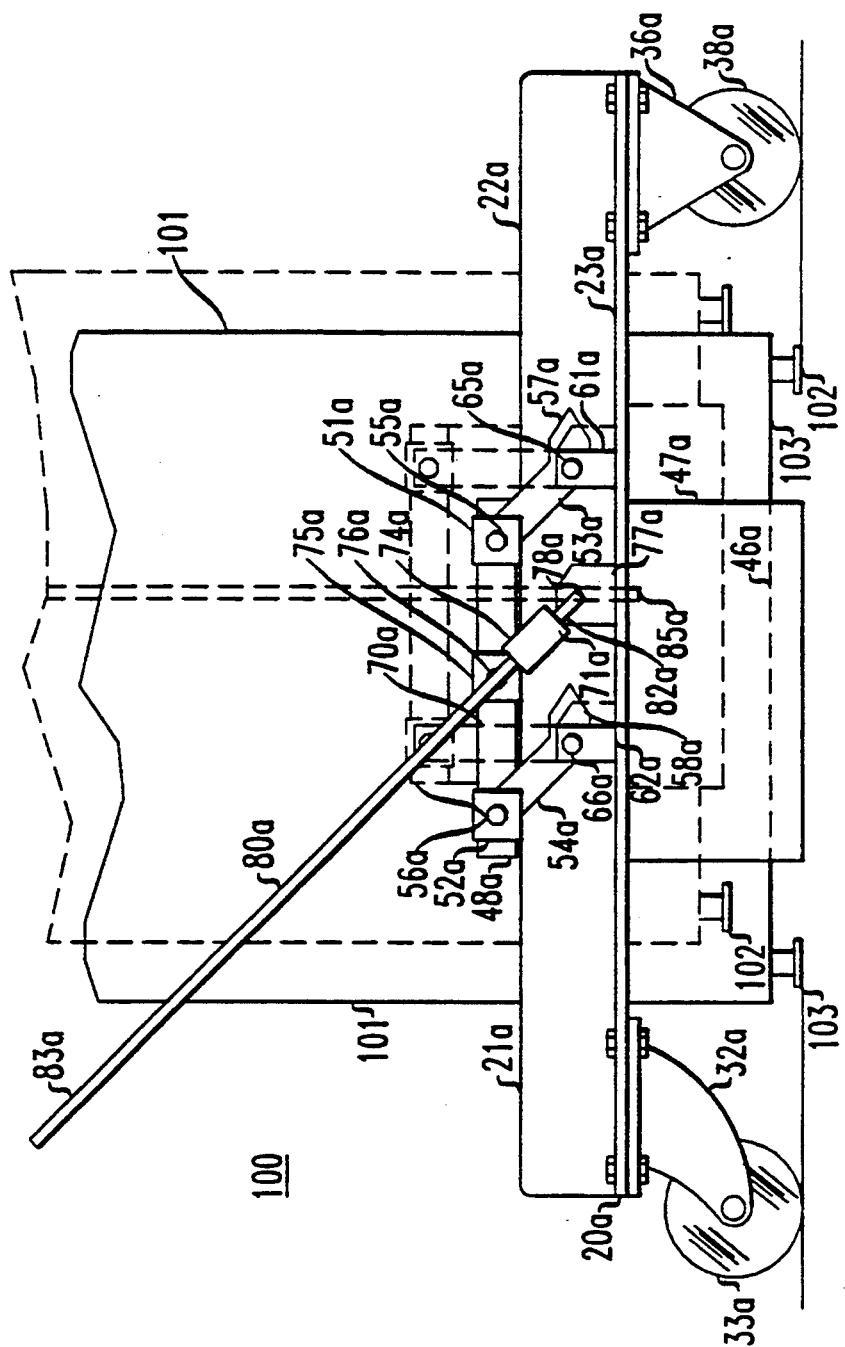
FIG. 2 is a right-side elevation of the FIG. 1 dolly which shows primarily the right load lifting device in both its ready condition (shown in solid line in FIG. 2) to lift a load (shown in phantom in FIG. 2) and the device's actuated condition (shown in phantom in FIG. 2 but in solid line in FIG. 1)

The bolts 65a and 66a are horizontally spaced from each other by the same distance as horizontally separates the bolts 55a and 56a. The link arms 53a and 54a thus couple together the beam 20a and the shoe 50a to form therewith a parallelogram linkage 70a. Such linkage is adjustable between different angular configurations therefor at which the angles made between the link arms and a horizontal line are different, but in which the sides of the linkage remain parallel. FIG. 2 shows in solid line a first non-orthogonal one of such configurations in which the arms 53a, 54a make an acute angle with the line between bolts 55a, 56a, and the lower portion of lip 46a of the shoe is in the down position. The same figure also shows in phantom a second orthogonal angular configuration of the linkage in which arms 53a, 54a make approximately a right angle with the horizontal line between bolts 55a, 56a, and the lip 46a is in up position.

The lower ends of the link arms 53a, 54a are shaped to provide those arms with respective elbows 57a, 58a which project outwardly and rearwardly from the main linking portions of those arms. As shown in FIG. 2, when the parallelogram linkage 70 is shifted to from its first (solid line) configuration to its second (phantom configuration), the elbows 57a, 58a pivot down into close proximity or engagement with the horizontal beam web 23a. In so doing the elbows 57a, 58a serve as stops preventing the linkage 70a from being shifted rearward substantially past the point at which it reaches its orthogonal configuration.

The linkage 70a is shifted from its first to its second configuration by a force-multiplying lever arrangement of the following character. The earlier described arms 53a and 54a are supplemented by a load transfer arm 71a disposed longitudinally between and parallel to the arms 53a, 54a. Arm 71 is provided by a metal piece which is cast or machined or otherwise formed to have two end portions 72a, 73a of the thickness of arms 53a, 54a and a raised central portion 74a projecting out from those end portions by several times their thickness. The upper end portion 72a of the transfer arm 71a is pivotably coupled to the shoe 50a (in a manner similar to the coupling to the shoe of arms 53a, 54a) by way of a bracket 75a on the shoe and a bolt 76a passing through unthreaded holes in the elements 75a, 72a and 48a and into a hole in the lift plate 47a to become threadedly engaged therein with that plate. The lower end portion 73a of transfer arms 71a is pivotably coupled to the beam 20a (in a manner similar to the coupling to that beam of the arms 53a, 54a) by way of a lug 77a on the beam and a bolt 78a passing through unthreaded holes in elements 77a, 73a and into a hole in vertical beam web 24a to threadedly engage with that web. Bolts 76a and 78a serve as pivot pins for the load transfer arm 71a. The center of upper bolt 76a for transfer arm 71a lies in the same horizontal line as do the center of the upper coupling bolts 55a and 56a for the link arms 53a, 54. Likewise, the centers of the lower coupling bolt 78a for the transfer arm 71a lies in the same horizontal line as do the centers of the lower coupling bolts 65a, 66a for link arms 53a, 54a. Also the line between the the centers of bolts 76a, 78a is of the same length as and parallel to the line between the centers of bolts 55a, 65a (or of bolts 56a, 66a). Hence load transfer arm 71a is a part of parallelogram linkage 70a forming in the linkage a third supplemental link arm.

The raised central portion 74a of load transfer arm 71a has formed therein, outward of the arm's flat end portions 72a, 73a, a circular cylindrical bore 81a extending through that central portion in the arm's lengthwise direction to make that raised portion a sleeve. Received within that bore with a sliding fit is the lower part of a long solid rod 80a extending upward from the sleeve 74a to the top 83a of the rod for a distance along the centerline of the rod on the order of 32 inches. Rod 80a serves as a handle and lever. Upward retraction of the rod from the bore in the sleeve 74a is prevented by a cotter pin 84a passing horizontally through the rod by way of a hole thereon disposed below the sleeve 74a but above the lower tip 82a of the rod.

The horizontal beam web 23a has formed therein a hole 85a disposed directly below the bore in the sleeve 74a when that sleeve is fully upright. When sleeve 74a is so upright, the rod 80a lowered to advance its tip 82a down into hole 85a until further downward movement of the rod is stopped by the cotter pin 84a contacting the mentioned beam web.

The positioning of rod tip 82a in hole 85a locks, except for play, the rod 80a in full vertical position (and, hence, the linkage 70 in orthogonal configuration) for reasons as follows. For any higher or lower position of the rod relative to the sleeve 74a, the rod 70a has a virtual pivot axis which coincides with the centerline of bolt 78a and around which the rod turns as the linkage 70a changes in angular position. That is, if the rod is positioned relative to sleeve 74a to dispose the rod tip 82a just above beam web 23a, and the top 83a of the rod is then moved to the right or left (FIG. 2), the rod will pivot about that virtual axis to cause the rod's lower tip to move, respectively, left and right. When, however, the rod tip 82a is lowered into hole 85a and it is then tried to move the rod top to the right or left, the rod initially may undergo a slight pivoting about that axis, but the rod tip will then make contact with the metal interior wall bounding hole 85a on respectively, the frontward side and the rearward side of that hole to stop any further pivoting of the rod. Thus, when the rod tip 82a is inserted into hole 85a, the rod 80a is locked, except for slight play, from departing either forwards or rearwards from its full vertical position, and the parallelogram linkage is similarly locked in its orthogonal angular configuration.

With the shoe 50a initially being in down position (solid line in FIG. 2) and the rod 80a initially extending upward and leftward away from sleeve 74a, and linkage 70a being in its first non-orthogonal configuration, the rod is used as a handle to shift the linkage to its second orthogonal configuration and concurrently, the shoe 50a (and its lip 46a) to its up position. That is, manual force is exerted on the rod's top 83a to move it in an arc from left to right (FIG. 2) until the rod reaches its end position shown in phantom (FIG. 2). Such rod movement effects the shifting just mentioned of the linkage 70a and the shoe 50a and lip 46a thereon. In the course of such rod movement, the rod acts not only as a handle but also as a lever which operates with linkage 70a to increase greatly at the lip 46a by mechanical action (as contrasted to, say, hydraulic action) the amount of hand exerted force applied to the top 83a of the handle. The amount of increase of such force is given by the equation $$F_0 = \left(\frac{a}{h}\right) F_i$$

where $F_i$ is the amount of manually applied force exerted on the top 83a of the handle 80a, a is the arcuate distance over which that top travels as handle 80a is pushed from its leftward position to its rightward position shown in solid line and phantom, respectively, in FIG. 2, h is the vertical distance (height) by which the lip 46a of shoe 50a is raised as a result of that pushing of the handle 80a, $F_O$ is the increased force exerted upward by lip 46a (in the presence of a load thereon) in response to the manually applied force exerted on the handle top, and the value of the ratio (a/h) is the average mechanical advantage provided by the interaction of the lever 80a and the parallelogram linkage 70a. Typically, the arcuate throw of the handle top 83a is 30 inches and the height by which lip 46a is raised by that throw is 1½ inches to yield a mechanical advantage with a value of about 20.0 As a result, a person is capable of lifting 600 pounds of weight by the exertion of a mere average of 30 pounds of hand force on the handle 83a.

From what has been described, it is clear that the linkage 70a and lever handle 80a together form a jack means and that such jack means and shoe 50a together form on support beam 20a a lifting means for raising loads by the lower portion of lip 46a of the shoe 50a.

As earlier stated, the left hand lifting device 15b is a mirror image of the lifting device 15a just described but is otherwise a duplicate of that device. During use of the transporter vehicle 10, the two devices 15a and 15b are joined at their rear and front ends by the rear and front tie bars, 16 and 17. Rear tie bar 16 is provided by an "L" shaped angle iron having at its right hand end a pair of holes therein for reception of the bolts 41a, 42a, on the device 15a, and having at its left hand end another pair of holes for reception therein of corresponding bolts 41b, 42b on the device 15b. Tie bar 16 may be coupled to device 15a by only one or by both of bolts 41b, 42a and, similarly, may be coupled to device 15b by only one or by both of bolts 41b, 42b.

If the bar 16 is assembled with devices 15a, 15b to be coupled to each thereof by either one or two bolts as just described, the tie bar forms with those devices a horizontal platform constituting an articulated frame 90 which has a horizontal centerplane, and which borders the opening 12, and in which the frame elements 15a, 15b and 16 are constrained by the couplings between the bar 16 and devices 15a, 15b (and especially by the feature that the bolt holes of those couplings are surrounded by large extents of the horizontal webs through which those holes pass and belonging to the elements 15a, 15b and 16) to all remain angularly fixed in the vertical direction relative to the horizontal centerplane of the frame. If, however, the coupling within frame 90 of the tie bar 16 to either one of devices 15a, 15b is only by one of the mentioned bolts not fully tightened, then that device and the bar are relatively angularly adjustable in the horizontal direction. On the other hand, if the coupling within frame 90 of the tie bar 16 to either of devices 16 and 17 is by two of the mentioned bolts, then that tie bar and device are relatively angularly fixed in position in the horizontal direction.

The front tie bar 17 is provided by an "L" shaped angle iron having, at its right hand end, a hole for receipt therein of bolt 27a on device 15a and, at its left hand end, a hole for receipt therein of the bolt 27b on device 15b for coupling the tie bar 17 to the latter device. The couplings between tie bar 17 and devices 15a, 15b are non-rigid in the sense that, if the coupling between that tie bar and either of such devices is by a bolt which is not fully tightened, then the tie bar and that device are relatively angularly adjustable in the horizontal direction but, except for play, are not so adjustable in the vertical direction for the same reason as earlier explained in connection with the couplings between devices 15a, 15b and tie bar 16.

By the incorporation of both the tie bars 16 and 17 into the platform 90. The frame or platform has imparted thereto a closed loop configuration by virtue of which the frame extends entirely around the periphery of the opening 12 of the transporter. Such closed loop configuration for the frame or platform is preferred but not necessary. That is, there are applications of the invention in which the tie bar 17 may be dispensed with so as to impart to the frame provided by the platform 90 a configuration in the form of a "U" having vertical sides and a horizontal bottom. The use of the tie bar 17 in platform 90 has, however, the advantage that, even if the devices 15a, 15b are coupled by only one bolt each to the rear tie bar 16, the use in the frame of the front tie bar will maintain the devices 15a and 15b in parallel alignment with each other.

USE OF THE EMBODIMENT

Figure 3:
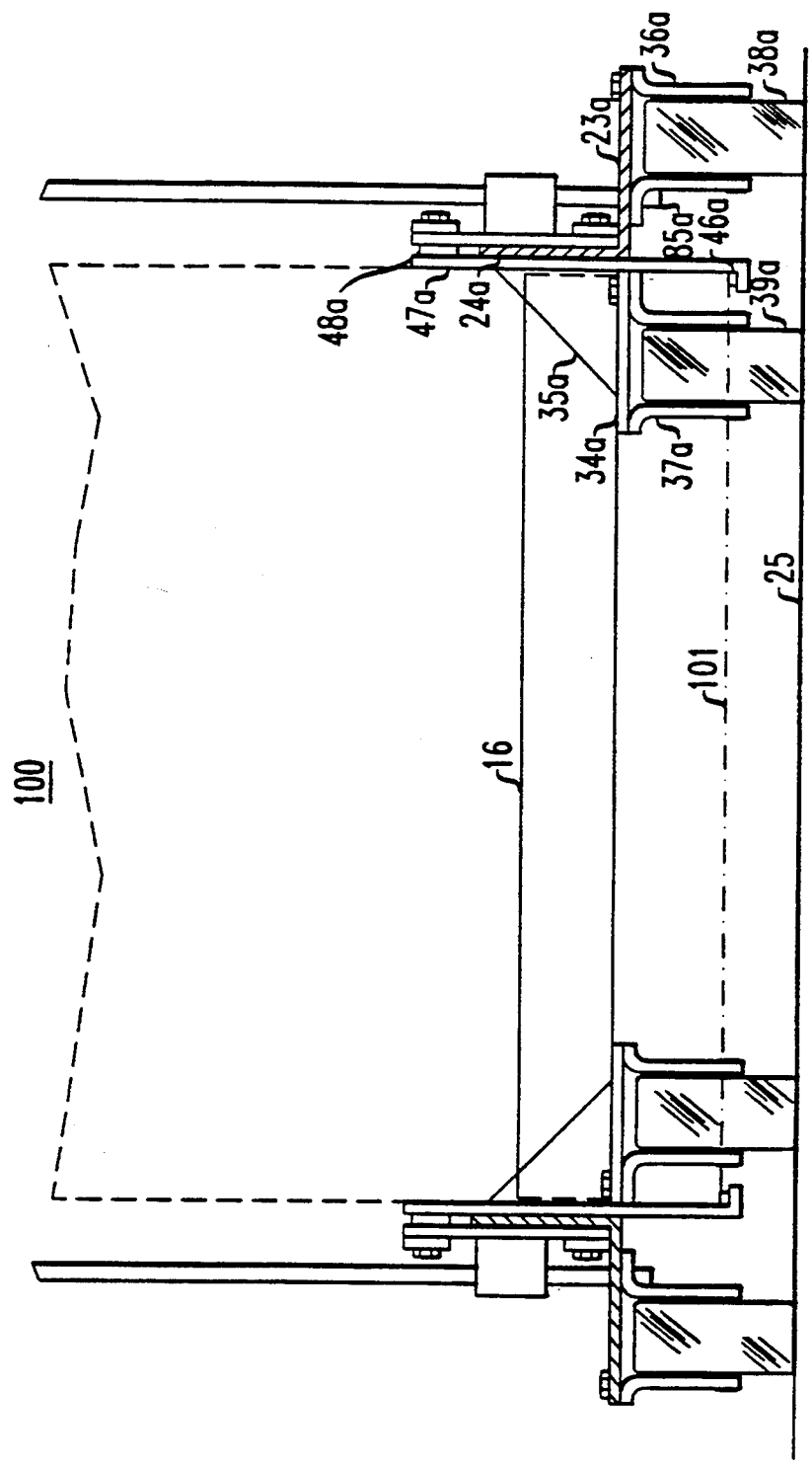
FIG. 3 is a front elevation in cross-section, taken as indicated by the arrows 3—3 in FIG. 1, when both the left and right load lifting devices have been actuated to lift the mentioned load which is shown in phantom in FIG. 3.
Figure 4:
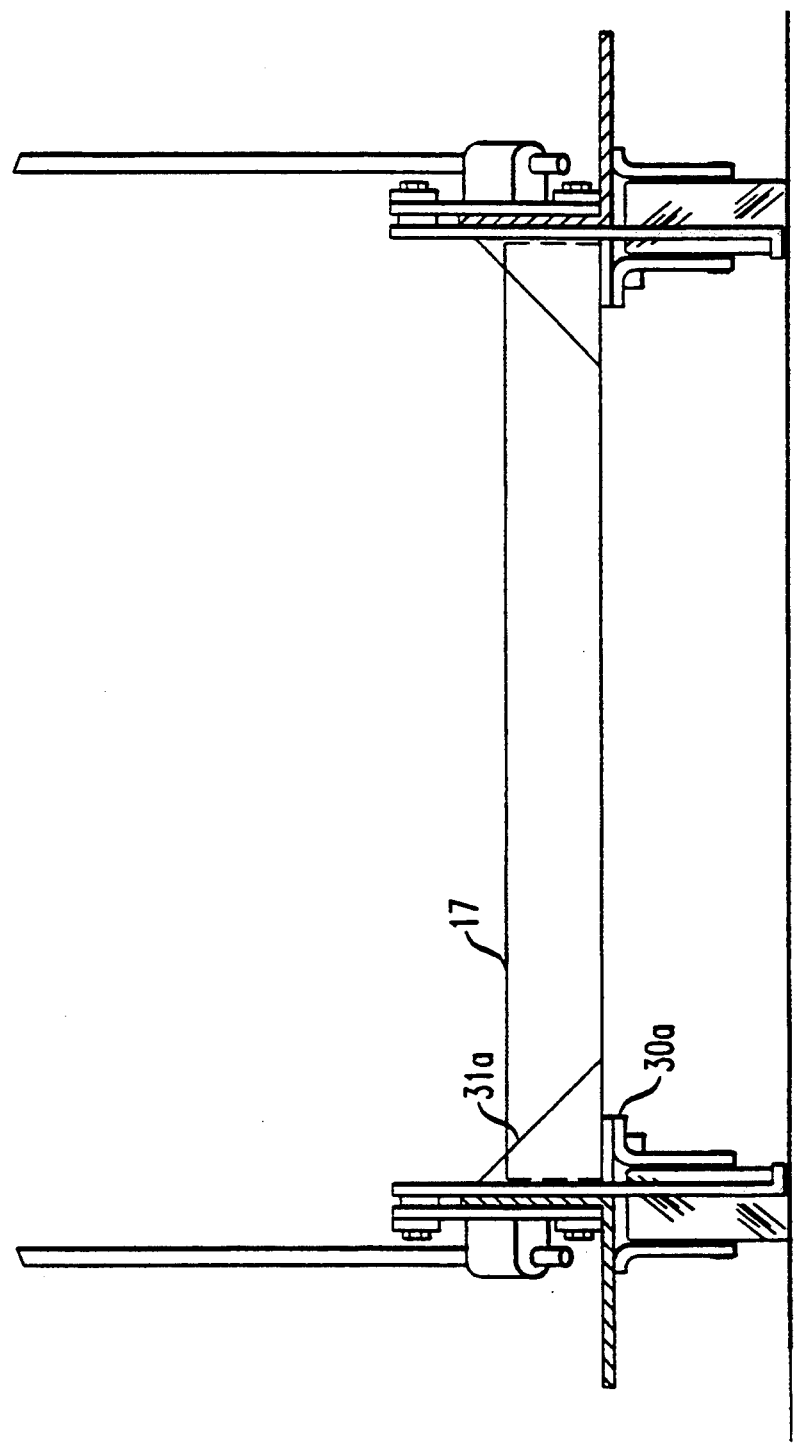
FIG. 4 is a rear elevation in cross-section, taken as indicated by the arrows 4-4 in FIG. 1, when both the left and right lifting devices are in arcuated or "ready" condition.

In FIGS. 2 and 3, the reference numeral 100 designates a load to be transported. The shown load 100 comprises an upright high-standing case 101 of rectangular parallelopiped form and seated on floor 25, telecommunications equipment (not shown) housed in the case and heavy enough to bring the weight of the load to 1100 pounds and leveling screws 102 supporting the case 101 a slight distance above floor 25 to form a crevice 103 between the floor and the bottom of the case.

As a preliminary to transporting load 100, the transporter vehicle 10 is brought into proximity therewith and then positioned with respect thereto so that the lower part of the load is disposed in the opening 12 between the left and right devices 15a and 15b. In order to effect such positioning it is necessary that the frame 90 be disassembled to the extent of being absent at least one of its frame members 15a, 15b 16 and 17 (the absent frame member preferably being the bar 17) since otherwise the opening 12 would be completely surrounded by frame 90, and there would be no way to get the load inside the frame.

Consonant, however, with that requirement of the absence of at least one of those frame members from frame 90, the frame can, to begin with, be in any one of its possible conditions of full or partial disassembly, as, for example, in the conditions where (a) all of frame elements 15a, 15b, 16 and 17 are uncoupled from each other (b) devices 15a and 15b are each coupled by one bolt to tie bar 16, and (c) devices 15a and 15b are coupled by two bolts to the tie bar 16. Whichever of those three conditions is most convenient to use will depend on the topography of the underside of load 100 but it is necessary, in any event, to start with the frame 90 in an initial condition permitting the lips 46a, 46b of the lifting devices 15a, 15b to be inserted on laterally opposite sides of load 100 into the crevice 103 beneath the case 101.

Assume that the initial condition selected for frame 90 is (b) so that devices 15a and 15b are connected by one bolt each to the tie bar 16, and so that the beams 20a, 20b of devices 15a, 15b make obtuse angles with the tie bar 16 on the sides of those frame elements bordering the opening 16. As a first step, that partly completed frame is positioned to bring tie bar 16 longitudinally close to and parallel to the back side of the load, with the couplings of the tie bar with the beams being on laterally opposite sides of the load. Then, the free ends, of the beams 20a, 20b are swung towards each other to position the lips 46a and 46b of lifting devices 15a, 15b in crevice 103 on the fight and left hand sides of the load. Next, tie bar 17 is connected by bolts to beams 20a, 20b to bring them into parallel alignment. After that, tie bar 17 is adjusted to produce orthogonal alignment between the beams 20 of the frame and the tie bars 16 and 17. Subsequently, all the bolts then used for coupling frame elements 15a, 15b, 16, 17 together are tightened enough to prevent, except for play, angular departure in the vertical direction of any of those elements from the horizontal center plane off the frame but loose enough so that such elements are relatively angularly adjustable in the horizontal direction. The transporter vehicle 10 is now fully ready to pick up and carry the load 100.

The pick-up of the load can easily be accomplished by one person (the "operator") as follows. At the time considered, the lips 46a, 46b of the lifting devices are both in their down position (as shown in FIG. 3) to be just above floor 25 and beneath the bottom of case 101. Moreover, both of those lips have a horizontal positioning relative to the frame 90 which is towards its forward end, and which is shown, for lip 46b, in FIG. 1, and for lip 46a, in solid line in FIG. 2.

To lift the load, the operator pushes first, say the lever handle, 80a of right hand device 15a in the rearward direction to shift parallelogram linkage 70a of the lift device from its non- orthogonal to its orthogonal configuration as earlier described and, as a result, to produce, first, engagement between lip 46a and the bottom of case 101 and, second, a vertical movement of lip 46a from its down position to its up position and a corresponding raising upward by the lip of the right hand side of case 101. The operator then locks lip 46a in up position and the linkage 70a in orthogonal configuration by inserting the lower tip 82a of lever 80a into the hole 85a in beam 20a.

The mentioned up movement of the fight hand side of the case is accompanied by a tilt of the load towards the left since the leveling screws on its left hand side will remain on the floor 25. Inasmuch, however, as the up movement of lip 46a is only about 1½", that tilt is so small as to create no problem in the lifting of the load. What is important is that the operator by a single motion is able to easily raise one-half the weight of the load (such one-half weight being 650 pounds) and to hold one side of the load locked in raised position above the floor.

The vertical up movement of lip 46a is accompanied by a horizontal shifting of the lip, relative to frame 90, from a forward position to the rearward position shown in FIG. 1 and in phantom in FIG. 2. FIG. 2 might suggest that such rearward relative movement between the lip and frame is produced by a rearward movement of the lip relative to the floor 25. What happens in fact, however, is that, because the left side of the load is still resting on the floor, the lip 46a remains stationary relative to the floor while the lifting device 15a undergoes a retrograde forward rolling movement over floor 25 in order to provide the relative movement just described between the lip 46a and the frame 90a. Lifting device 15b at this time is preferably kept horizontally stationary relative to floor 25, the coupling bolts then in frame 90 being kept lose enough to permit the described retrograde movement of lift device 15a relative to device 15b.

When the jack means on left device 15a exerts on lip 46 an upward force $F_O$ for raising the fight hand side of load 100, the load exerts on that lip an opposite and equal reactive force $F_r$. The force $F_r$ can, for analysis purposes, be considered to be a concentrated force acting on lip 46a at its horizontal center. Since that center is horizontally inward of the beam 20a from which the active force $F_O$ is originally exerted, the reactive force Fr develops on beam 20a a counterclockwise (FIG. 3) moment of force tending to upset the beam. Inasmuch, however, as the horizontal center of lip 46a is disposed in the sidewise direction for beam 20a laterally between rear wheels 53a and 54a, those wheels produce a counteractive moment of force which cancels out the moment of force from reactive force $F_r$. The wheels 53a, 54a thus stabilize the lift device 15a from being upset in the course of lifting the right side of load 100 to its held raised position above floor 25. Such stabilization of lift device 15 by its pair of laterally spaced angularly fixed rear wheels occurs irrespective of whether or not the device is coupled to one or both of tie bars 16, 17, or if so coupled, irrespective of the looseness or tightness of the coupling.

While the fight hand side of the load is being so raised by lift device 15a, the left hand lift device 15b is in its initial condition shown in FIG. 1 wherein the handle 80b of the device is in forward position and the lip 46b is vertically in down position and horizontally at a position where it is displaced towards the forward end of the frame 90. Having lifted the fight side of load 100, the operator now completes the lifting job by pushing the handle 80b to its rearward position to thereby shift with mechanical advantage the parallelogram linkage in device 15b from its non-orthogonal configuration to its orthogonal configuration, and to shift the lip 46b on that device vertically from its down to its up position. The lower tip 82b of the handle 80b of beam 20b is then advanced into the hole 85b in the horizontal beam web 23b of device 15b to thereby lock such linkage and lip in, respectively, the condition and position just described. As a result, the left hand side of load 100 is lifted to and held at a raised position above floor 25 at the same distance from the floor as the right hand side of the load is now held. That is, the tilt in the load has been removed and the load is now fully upright (FIG. 3) and ready for transportation.

In the course of lifting the left hand side of the load, the lip 46b undergoes relative to beam 20b a horizontal rearward displacement which translates into a forward displacement of beam 20b relative to the beam 20a, of device 20a. The result of that forward relative displacement of beam 20b is to change the frame 90 from the slightly skewed alignment it assumed when lift device 15a was operated back to an alignment in which the beams 20a, 20b are orthogonal with the tie bars 16 and 17. Once the frame 90 has regained that orthogonal alignment, the bolts previously missing from the coupling of beams 20a, 20b with the bar 16 are inserted to convert those couplings from one bolt to two bolt couplings. As a result, the beams 20a, 20b became fixedly angularly connected in the horizontal direction with the tie bar 16, and the frame 90 as a whole is rendered a rigid frame. Thereupon, the coupling bolts now included in frame 90 are fully tightened, and the transporter vehicle 10 is in completely ready to be hand propelled to transport the load 100 over floor 25.

DETAILS OF MODIFICATION

As described, the lifting devices 15a, 15b of the FIG. 1 embodiment raise the shoes 50a, 50b of transporter 10 relative to its beams by the use of simple parallelogram which are formed by links and by portions of such shoes and beams, and which linkages are operably deformed to so lift those shoes. A consequence, however, of the employment of those simple linkages is, as earlier described, that, in the course of lifting of each shoe, the upwardly vertical component of movement of the shoe is necessarily accompanied by a horizontal shifting of the shoe relative to the associated beam. There are occasions, however, where it would be preferable for the shoe movement in the course of the lifting action to be wholly vertical.

Figure 5:
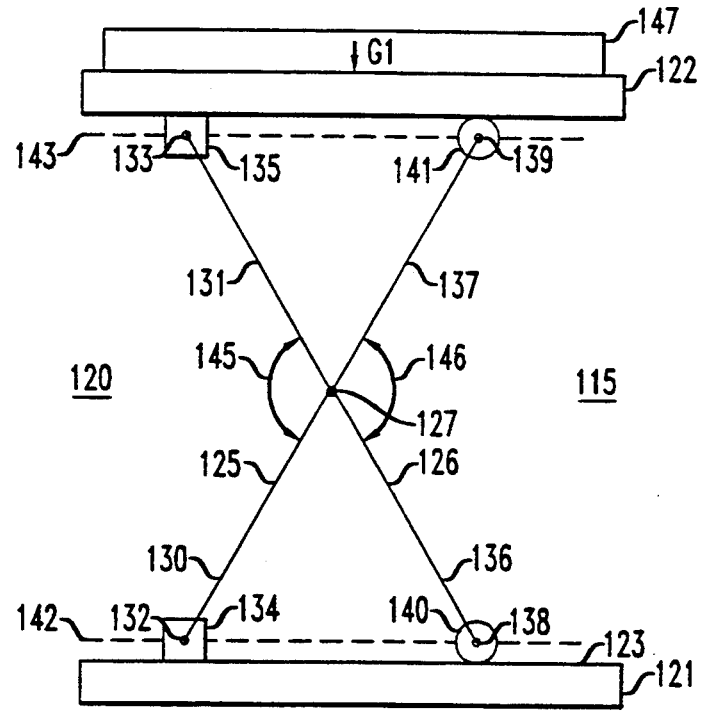
FIG. 5 is a schematic diagram of a device used in the prior art to lift loads.

FIG. 5 shows schematically a prior art arrangement which realizes that objective, and which is disclosed in U.S. Pat. No. 2,931,519 issued Apr. 5, 1960 in the name of J. J. Beach for Aircraft Component Dolly. In that figure, the reference numeral 120 designates a jack comprising a stationary base 121 and a load lifting platform 122 disposed a vertical distance above base 121. Base 121 has a horizontal upper surface 123, and platform 122 has a horizontal lower surface 124.

Extending between elements 121 and 122 is an "X" or scissors linkage 115 comprising two cross arms, 125 and 126 coupled together by a pivot 127 consisting of a shaft or pin passing through each of those arms at central locations in the lengths thereof. Pivot 127 provides for arms 125, 126 a multi-link pivot about which those arms are each angularly movable.

The portions of arms 125 and 126 to the left (FIG. 5) of pivot 127 form links 130 and 131 coupled at their ends away from that multi-link pivot to single link pivots 132 and 133 received in bearing blocks 134 and 135 fixedly mounted on, respectively, base 121 and platform 122. The portions of arms 125, 126 to the right of pivot 127 form guide struts 136 and 137 carrying pivot shafts 138 and 139 which mount rollers 140 and 141 rotatable about the axes of those last named pivots.

All of pivots 132, 133, 138 and 139 are equidistant from the central multilink pivot 127. Rollers 140 and 141 are shown as being in contact with the horizontal surfaces 123 and 124 of, respectively, base 121 and platform 122 to be rollable horizontally on those surfaces.

Those rollers 140 and 141 have respective radii which are equal to, respectively, the vertical distance of pivot 132 from the base surface 123 and the vertical distance of pivot 133 from the platform surface 124. Hence, as rollers 140 and 141 roll on the surfaces 123 and 124, the pivots 138 and 139 on the guide struts 136 and 137 undergo horizontal movement in respective linear horizontal paths 142 and 143 coincident with horizontal lines passing through the axes or centers of the pivots 132 and 133 by which links 130 and 131 are coupled to, respectively, the base 121 and platform 122.

In the operation of the jack 120 to lift a load 147 on platform 122, the "X" linkage 115 is forcibly driven by a linkage actuating means (not shown in FIG. 5) to increase both the spread angle 145 between the centerlines of the links 130, 131 and the corresponding spread angle 146 between the guide struts 136 and 137. Effects concurrent with that forcible increase in those spread angles are that (a) the downward force from the load 147 on platform 122 is transmitted both by way of links 131 and 130 and by way of guide struts 137, 136 and their rollers 141, 140 to the base 121, (b) rollers 141 and 140 roll on surfaces 123 and 124 to decrease the horizontal distance between those rollers and pivots 132, 133, and (c) platform 122 is displaced vertically upward relative to stationary base 121 to raise load 147.

It can be shown by geometric considerations that, so long as the center of gravity G1 of load 147 is at a position to the right of pivot 133, the "X" linkage 115 will operate in such manner that the pivot 133 will be continuously maintained by the linkage to be directly above pivot 132. That is, the platform 122 is constrained from any horizontal translational movement relative to base 121 and, therefore, the movement of the platform relative to the base will be wholly vertical. i.e., have no horizontal component.

Further, so long as the center of gravity G1 of load 147 is to the right of pivot 133, the load will be supported not only through the links 130 and 131 but, also through the guide struts 136, 137 and their rollers 138, 139 and, when load 147 is so supported, the "X" linkage serves to maintain platform 122 fixed at the angular position at which is horizontal and parallel to base 121.

A disadvantage, however, of the described "X" linkage 115 as the lifting instrumentality for jack 120 is that, if platform 122 receives a load having a center of gravity G1 to the left of pivot 133, the weight of the load will produce around pivot 133 a counterclockwise movement of force causing the platform 122 to rotate around that pivot to topple the load and dump it off the platform.

Another disadvantage of the described "X" linkage as a lifting instrumentality is that, as the spread angles 145 and 146 progressively increase in order to lift load 147 higher, the horizontal distances between rollers 138, 139 and pivots 132, 133 progressively decrease to the point where the spans between those rollers and pivots may be short to provide stable support for the load. The reasons for the unstability are as follows.

As long as the center of gravity G1 of load 147 is, as shown (FIG. 5), located between pivot 133 and roller 139, the total weight of load 147 will be distributed between that pivot and roller in inverse proportion to the ratio of the horizontal distance between 133 and G1 to the horizontal distance between 139 and G1, but in no event will the downward force on either of elements 133 and 139 exceed the load weight. If, however, roller 139 approaches so close to pivot 133 that G1 becomes located to the right of the roller, then the downward force on the roller is equal to such weight multiplied by the ratio of the distance of G1 from pivot 133 to the distance of roller 139 from pivot 133. In that instance, the downward force on roller 139 can be very large as, for example without restriction, five times the weight of the load itself. Such a large force, however, may well cause deformation or breaking of guide strut 137 or excessive stress in roller 139 at its line contact with platform 122.

Figure 6:
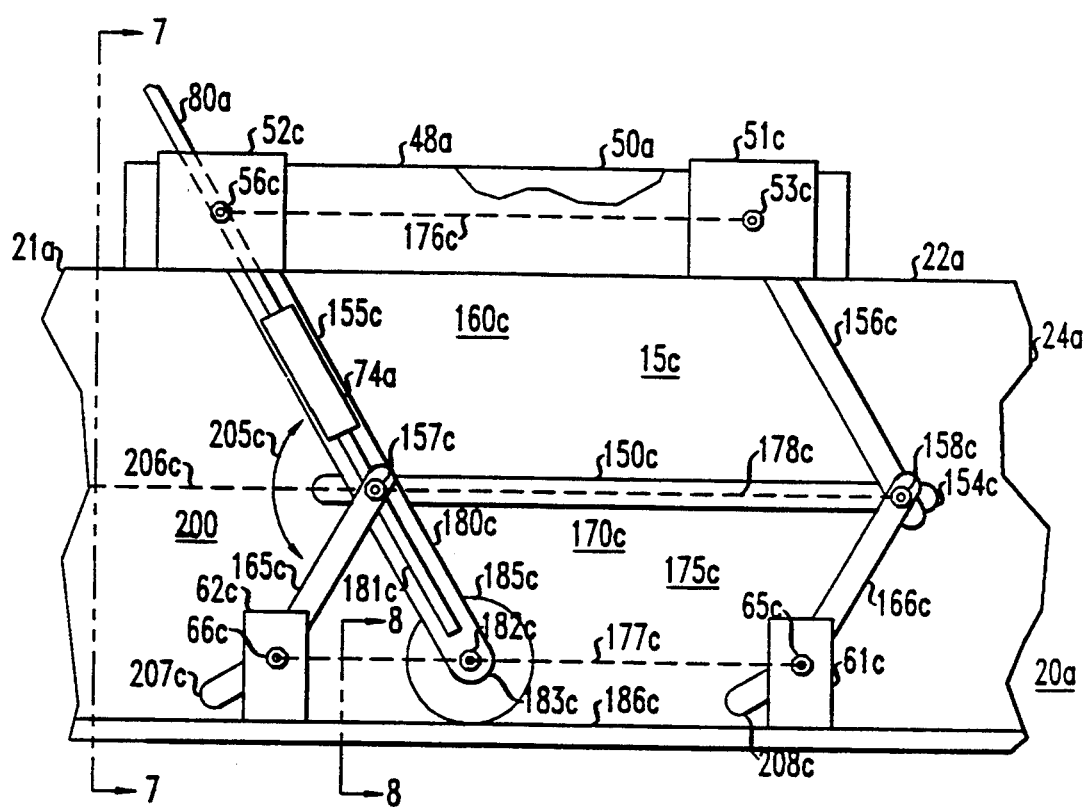
FIG. 6 is a fight-side elevation of a modification of the right load lifting device of the FIG. 1 transporter vehicle.
Figure 7:
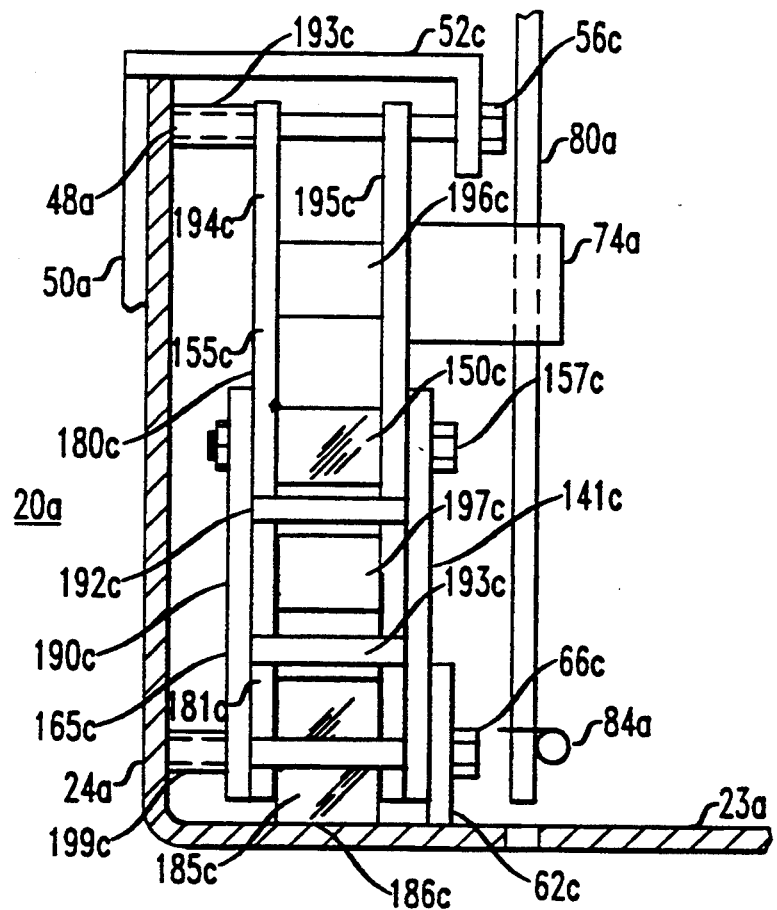
FIG. 7 is a front elevation of a cross-section, taken as indicated by the arrows 7—7 in FIG. 6 of the FIG. 6 modification.
Figure 8:
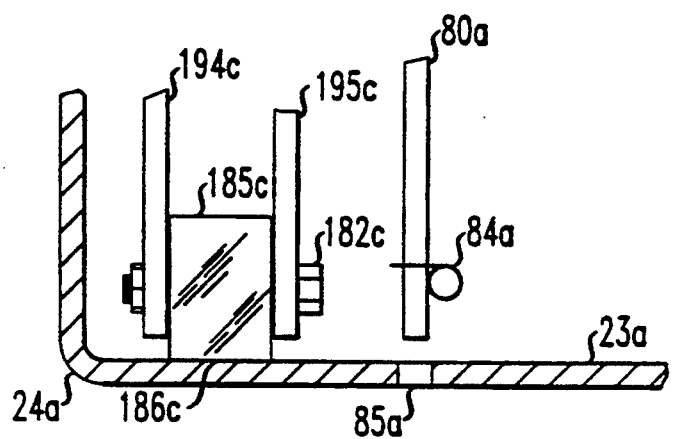
FIG. 8 is a front elevation of a fragmentary cross-section, taken as indicated by the arrows 8—8 in FIG. 6, of the FIG. 6 modification.

Those disadvantages of the FIG. 5 jack are avoided by the modified jack 15c shown by FIGS. 6–8. In that latter jack, the jack elements 51c, 52c, 55c, 56c, 61c, 62c and 65c, 66c are respective counterparts of the elements with the same reference numerals in the jack 15a of the FIG. 1 embodiment except that the laterally outer ends of the jack 15c elements (or, in the case of lugs 61c, 62c, the lugs themselves) are disposed laterally farther from the vertical web 24a of beam 20a than are their counterparts in the FIG. 1 embodiment.

In the jack 15c, a longitudinally horizontally extending yoke bar 150c is disposed between the shim 48a at the top of shoe 50a and the beam 20a as represented by its horizontal web 23a. Extending between yoke bar 150 and the brackets 56c and 55c mounted on shoe 50a (FIG. 7) are upper forward and rearward horizontally spaced links 155c, 156c coupled at opposite ends to, respectively, the pivots 56c and 55c carried by brackets 52c, 51c, and two multi-link pivots 157c, 158c carried by bar 150c at, respectively, its forward and rearward ends 153c, 154c. Each of links 155c, 156c is angularly movable about each of its pivots to which that link is coupled. The links 155c, 156c form, together with the shoe 50a and the bar 150c, an upper simple parallelogram linkage 160c shiftable over a range of angular configurations therefor.

The yoke bar 150c also has associated therewith lower forward and rearward longitudinally horizontally spaced lower links 165c, 166c coupled at opposite ends to, respectively, the multilink pivots 157c, 158c and the pivots 66c, 65c carried by the lugs 62c, 61c mounted on beam 20a. Each of links 165c, 166c is angularly movable about each of the pivots to which it is coupled. The links 165c, 166c form, together with the beam 20a and bar 150c a lower simple parallelogram linkage 170c shiftable over a range of angular configurations therefor.

The upper and lower simple parallelogram linkages 160c and 170c together form a compound parallelogram linkage 175c. The compound parallelogram linkage 175 is defined by (a) straight horizontal lines 176c and 177c which are fixed in relation, to respectively the shoe 50a and beam 20a and extend between respectively the pivots 56c, 55c and the pivots 66c, 65c, (b) another straight horizontal line 178c which is fixed in relation to yoke bar 150c and extends between the multilink pivots 157c, 158c carried thereby, and (c) lines extending on each of the links 155c, 156c, 165c, 166c between the two pivots with which each such link is coupled. Each of those four links has the same distance of separation between the two pivots to which that link is coupled. In the compound linkage 175c its four links can be grouped into a forward pair of links 155c, 165c and a rearward pair of links 156c, 166c.

Linkage 175c has a changeable configuration which is a composite of the respective configurations of the simple linkages 160c and 170c. The yoke bar 150c serves in the composite linkage to couple together the upper and lower simple linkage 160c and 170c so as to maintain constant the parallel angular position of bar 150c relative to each of shoe 50a and beam 20a despite changes over a range in the configuration of the composite linkage 175c. From what has just been stated, it follows that, as the compound linkage changes in configuration, the linkage will keep shoe 50a and beam 20 (as represented by lines 176c, 177c) parallel to yoke bar 150c (as represented by line 178c) and, thus, to each other. Hence Linkage 175c will, during a lifting of a load by shoe 50a, continuously keep the shoe 50a horizontal because beam 20a is then horizontal.

In that respect, compound linkage 175c operates the same as the simple parallelogram linkage of jack 15a of the FIG. 1 embodiment. As a very important difference, however, is that, because in the jack 15a, the shoe 50a and beam 20a are directly coupled together by that simple linkage, the mode of coupling, forces the shoe 50a to move horizontally (as earlier described) relative to beam 20a as the linkage configuration is changed to raise the shoe. The compound linkage 175c on the other hand does not, of itself, impose any constraint on the horizontal translational position of shoe 50a relative to beam 20 as the shoe is raised. Thus, the use of a compound linkage in a jack avoids that fundamental difficulty in the use of a simple linkage in a jack. However, a constraint of such kind is needed as to the extent that will control the configuration of linkage 175c in a manner which assures that, as such configuration changes, its effect will be to raise shoe 50a vertically upward from 20a without any horizontal component of movement at all of the shoe relative to the beam. The last named constraint is provided in the jack 15c by a linkage guiding means which (although it may be of various kinds) takes in jack 15c the following form.

In the FIG. 6 modification, the link 155C is provided by the upper half of a cross arm 180c of which the lower half provides a guide strut 181c projecting downward and rightward from multi-link pivot 157c in the opposite direction from the projection from that pivot of link 155c. The strut 181c is thus fixedly positioned relative to the link 155c. Strut 181c carries at its outer end a pivot 182c of which the laterally horizontal axis 183c is on the straight horizontal line 177c also passing through the axes of pivots 65c and 66c. The center-to-center separation distance between pivots 182c and 157c is the same as the center-m-center separation distance between pivots 157c and 56c and between pivots 157c and 66c.

The pivot 182c has mounted thereon a cylindrical roller 185c disposed over a horizontal longitudinally extending track 186c provided by the upper surface of the horizontal web 23a of beam 20a. During operation of jack 15c, roller 185c is caused by the weight of the load on shoe 50a to stay in contact with the track 186c and to roll on it towards pivot 66c as the jack is actuated. The radius of roller 185c is equal to the vertical distance between track 186c and the horizontal line 177c which passes through the center of pivot 66c. Accordingly as roller 185c rolls on track 186c, the axis 183c of pivot 182c and of the roller moves in a linear horizontal path coincident with that line 177c.

Referring now to FIGS. 7 and 8, the link 165c is formed of two thin elongated parallel bars 190c, 191c through which the pivots 66c and 157c pass, and which bars 190c, 191c are held in fixed horizontally spaced relation by braces 192c, 193c spaced along the bars and extending laterally horizontally between and welded to both of bars 190c, 191c. Similarly, the cross arm 180c is formed of two thin elongated parallel bars 194c, 195c through which the pivots 56c, 157c and 182c pass, and which bars 194c, 195c are held in fixed horizontally laterally spaced relation by braces 196c, 197c spaced along arm 180c and extending laterally horizontally between and welded to both of bars 194c and 195c. Link 166c has a construction similar to link 165c and link 156c has a construction similar to the link portion 155c of arm 180c. Cylindrical spacers 198c and 199c on the pivots 56c and 66c are used to hold, respectively, the cross arm 180c and the link 165c away from the vertical beam web 24a. Links 156c and 166c (FIG. 6) have constructions similar to link 165c and are similarly held away from web 24a.

The compound linkage 175c is changed in configuration to raise shoe 50 relative to beam 50 by hand actuated drive means which is motion coupled to that compound linkage, and which takes the same form in FIG. 6 as it does in the FIG. 1 embodiment in that such drive means comprises the sleeve 74a (mounted, in the case of the FIG. 6 jack, on the outer side of the link 155c), the lever rod 80a slidable lengthwise in sleeve 74a to the extent permitted by cotter pin 84a (FIG. 7) passing through rod 80a, and hole 85a formed in the horizontal web 23a of beam 20a.

In the operation of the FIG. 6 jack, the direct effect of the pushing forward by hand of the top of lever rod 80a is to alter the configuration of the upper simple parallelogram linkage 160c in the same way as rod 80a alters the configuration of the simple parallelogram linkage of the jack 15a of the FIG. 1 embodiment. In, however, the FIG. 6 jack an additional effect occurs. To wit, in the FIG. 6 jack the links 155c, 165c and the guide strut 185c with its roller 185c are responsive to hand actuation of lever rod 80a to behave in the same manner as the already described "X" linkage 115 of FIG. 5 would behave in the same circumstances if that "X" linkage were to lack guide strut 137 but otherwise be complete. That is, the three-quarter "X" linkage 200c provided by links 155c, 165c and strut 181c cooperates with the compound linkage 175c of that jack so that, as the top of rod 80a is pushed forward to increase the spread angle 205c between the links 155c and 165c, the three-quarter "X" linkage causes the similar upper and lower simple parallelogram linkages 160c and 170c to undergo shifts in their configurations of the same angular amount to thereby maintain coincident with the horizontal line 178c of yoke bar 150, the line 206c which is the bisector of the spread angle 205c. However, by so constraining bisector line 206 to remain coincident with the interpivot line 178c of yoke bar 150c, the pivot 56c is in turn constrained to move upward wholly vertically in relation to pivot 66c, and the shoe 50a is, accordingly, constrained from undergoing any horizontal translational movement relative to beam 20a.

With the described three-quarter "X" linkage 200c lacking any element corresponding to the guide strut 137 of the "X" linkage of FIG. 5, such partial "X" linkage 200c provides no support to the right of pivot 56c for the shoe 50a. That lack is, however, more than made up for by the fact that the links 155c, 165c of such partial "X" linkage 200c also constitute links of the compound linkage 175c. That compound linkage will, however, as earlier explained, keep shoe 50a horizontal and parallel to horizontal beam 20a as the shoe is raised by jack 15c to lift a load. Hence, the jack 150c will, because of the use therein of such compound linkage in combination with such partial "X" linkage, be immune from the disadvantages earlier described as characterizing the prior art FIG. 5-"X" linkage. Specifically, such compound linkage prevents a load from being dumped off shoe 50 in the event the center of gravity of the load is leftward of pivot 56c. Further, since there is no shortening of the span between the two pivots 56c and 55c which support the shoe 50a and a load thereon when the shoe is raised, the downward force exerted by the load at either of these pivots cannot exceed the weight of the load so long as, at the beginning of its rise, the center of gravity G1 of the load is horizontally between those two pivots.

If desired, the links 165c and 166c may, as shown (FIG. 6) be equipped with elbows 207c, 208c which are similar in operation to the elbows 57a, 58c (FIG. 2) in that, when those links are driven by lever rod 80a to undergo angular movement clockwise about their pivots 66c, 65c and the lower tip of rod 80a is not inserted at the proper time into hold 85a, the elbows 207c, 208c are eventually brought into contact with horizontal beam web 23a to thereby stop such movement.

Figure 9:
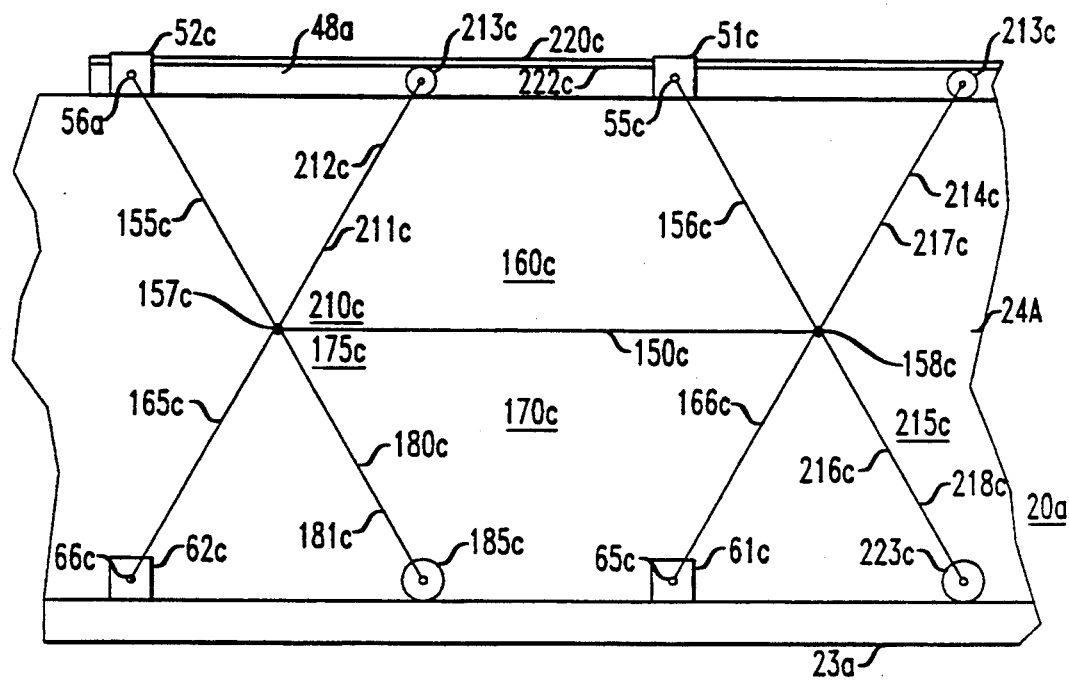
FIG. 9 is a schematic diagram of variants of the FIG. 6 modification.

FIG. 9 shows a variant of the FIG. 6 modified jack in which the three-quarter "X" linkage 200c of that jack has been converted into a full four-quarter "X" linkage 210c similar to the "X" linkage 115 (FIG. 5) by providing the link 165c by the lower half of a cross arm 211c movable about pivot 157c and having an upper half providing a guide strut 212c carrying at its outer end a roller 213c. Further, the bar 150c is coupled at its fight hand end through multi-link pivot 158c with a full "X" linkage 215c which is a counterpart in function and structure to linkage 210c, and which comprises two cross arms 216c and 217c coupled together at central regions in their lengths by pivot 158c. The left hand half of arm 216c provides the link 156c of compound parallelogram linkage 175c while the right hand half of that arm provides a guide strut 218c having at its outer end a roller 223c rollable in the track 186c on the upper surface of beam web 23a. The left hand half of arm 217c provides the link 166c of compound parallelograms linkage 175c, while the right hand half of the latter arm provides a guide strut 219c carrying at its outer end a roller 221c. Both roller 219c and roller 213c are rollable on a track 222c provided by the undersurface of a horizontal flange 220c projecting horizontally outward from the shim 48a secured to the top of shoe 50a (FIGS. 1 and 3).

Because the variant linkage of FIG. 9 supplements the guide strut 181c and roller 185c of the FIG. 6 linkage by additional guide struts 212c, 218c and 219c and their respective rollers, the FIG. 9 linkage provides more paths than does the FIG. 6 linkage through which downward force can be transmitted from shoe 50a to beam 20a. It is to be noted that any one, two or three of the guide struts 181c, 212c, 218c and 219c of the FIG. 9 linkage can be omitted (as exemplified by the FIG. 6 linkage which has only the one guide strut 181c), and the linkage can still be satisfactory to provide in jack 15c the wholly vertical uplifting of shoe 50a relative to beam 20a. The preferred embodiment is, however, for that strut 181c and roller 185c to be supplemented by the one additional strut 218c and roller 223.

The above described embodiment being exemplary only, it is to be understood that additions thereto, omissions therefrom and modifications thereof can be made without departing from the spirit of the invention. For example, without restriction, the loads capable of being lifted and conveyed by a transporter vehicle according to the invention are not limited to the specific kind of load described and shown herein but, rather, may be any kind of load which is disposable between two lifing devices and is engageable by those devices to be lifted on opposite sides thereby. Accordingly, the invention is not to be considered as limited save as is consonant with the recitals of the following claims.

We claim:

1. A transporter for loads comprising dolly means comprising, first and second laterally spaced horizontal support beams longitudinally extending between relatively forward and rearward portions thereof, forward and rearward wheels underneath each beam to make said dolly means rollable over a floor, and rigid elongated tie means extending between and secured to said beams to form therewith an articulated frame bordering an opening therein for accommodating within said frame a lower part of a load seated on said floor and bounded on laterally opposite sides thereof by said beams, said transporter further comprising; first and second shoes respectively carried by said first and second beams to be movable relative thereto between up and down positions, said shoes having respective lower portions which, when said shoes are down, are lodgeable beneath laterally opposite sides of said seated load for lifting it by upward movement of said shoes, and said shoes extending from said lower portions upwardly by and said beams to have respective longitudinally extending horizontal tops disposed vertically above said beams, and a first and second hand actuated jack respectively carried by said first and second beams and coupled with said first and second shoes, at said tops thereof, said two jack means being responsive to respective exertions thereon of manually applied forces to jack their corresponding shoes from their down to their up positions so as to lift said load to a raised position above said floor, at which time said load is transportable over said floor by rolling thereover an assembly of such transporter and said raised load, at lest said first jack comprising a compound parallelogram linkage comprising, a longitudinally extending yoke bar disposed between, and vertically spaced from each of the shoe top and the beam respective to that first jack, forward and rearward longitudinally horizontally spaced upper links extending between, and coupled at opposite ends to, respectively said yoke bar and such shoe top to be movable at said opposite ends about pivots carried by, respectively, such bar and shoe top so as to form therewith an upper simple parallelogram linkage shiftable over a range of angular configurations therefor, forward and rearward longitudinally horizontally spaced lower links extending between, and coupled at opposite ends to, respectively, said bar and such beam to be movable at such opposite ends about pivots carried by, respectively, said bar and such beam so as to form therewith a lower simple parallelogram linkage shiftable over a range of angular configurations therefor, the respective configurations of said upper and lower simple linkages together providing a changeable configuration for said compound linkage, and said yoke bar coupling together said upper and lower simple parallelogram linkages to maintain constant a angular position of said bar relative to each of the shoe top and beam coupled by said links to said bar, hand actuated drive means motion coupled to said compound linkage to change the configuration thereof so as to raise the corresponding shoe from said down to said up position therefor, and linkage guiding means cooperable with said compound linkage as such shoe is so raised to cause said changing in said configuration of said compound linkage to be produced by respective shiftings which occur in the configurations of said two simple linkages, and which are coordinated together to maintain the top of such shoe fixed in horizontal translational position relative to such beam as such shoe is raised.

2. A transporter according to claim 1 in which said pivots at the opposite ends of said upper links and lower links of said first jack are spaced along centerlines for said links by a separation distance between said pivots which is the same for all said links, said forward upper and lower links and said rearward upper and lower links form respective forward and rearward pairs of such links for which the respective centerlines of the links in each such pair are centerlines which intersect each other to define for that pair of links a spread angle which is bisected by a bisector line, and in which said linkage guiding means is cooperable with said compound linkage as said shoe is so raised to maintain horizontal said bisector line of the spread angle of each of said pair of links.

3. A transporter according to claim 2 in which the two links in each of said forward and rearward pairs of links are each coupled to said yoke bar by a multi-link pivot on said bar common to both of said links in each such pair of links.

4. A transporter according to claim 3 in which said linkage guiding means comprises: a guide strut which is movable about the multi-link pivot on said bar of the first of said forward and rearward pairs of links, and which guide strut is fixed with, and extends away from, the first of the two links of a first of said forward and rearward pairs of links, said guide strut extending away from said first link along its centerline to and beyond a reference point disposed on said strut along said centerline to be spaced from said multilink-pivot by said separation distance, and strut directing means effective upon change in the spread angle between such two links of said first pair of links to cause said point on said strut to follow a horizontal path coincident with a horizontal line passing through said pivot which is spaced by said distance from said multi-link pivot, and about which the second of said links in said first pair of links is movable.

5. A transporter according to claim 4 in which said strut directing means comprises a roller carried by said guide strut and rotatable about an axis through said point, and a horizontal track on which said roller is horizontally rollable by rotation about said axis, said track being disposed on said beam to be parallel to, and spaced by the radius of said roller from, said horizontal path, and means to maintain such roller in contact with said path.

* * * * *